United States Patent
Törneld

[19]

[11] Patent Number: 5,938,220
[45] Date of Patent: Aug. 17, 1999

[54] PIVOT BUSHING FOR MCPHERSON TYPE SUSPENSION

[75] Inventor: Per Törneld, Alingsås, Sweden

[73] Assignee: AB Volvo, Sweden

[21] Appl. No.: 08/765,652

[22] PCT Filed: Jun. 27, 1995

[86] PCT No.: PCT/SE95/00799

§ 371 Date: Apr. 21, 1997

§ 102(e) Date: Apr. 21, 1997

[87] PCT Pub. No.: WO96/00662

PCT Pub. Date: Jan. 11, 1996

[30] Foreign Application Priority Data

Jun. 28, 1994 [SE] Sweden .................................. 9402291

[51] Int. Cl.[6] .................................................. B60G 7/02
[52] U.S. Cl. ........................... 280/124.145; 280/124.134; 280/788; 267/293; 267/141.7
[58] Field of Search ..................................... 280/668, 673, 280/666, 663, 696, 701, 691, 690, 725, 726, 716, 717, 688, 788, 124.134, 124.145, 124.146, 124.109, 124.111, 124.177, 124.179; 267/292, 293, 141, 141.2, 141.3, 141.7

[56] References Cited

U.S. PATENT DOCUMENTS 4,030,714  6/1977  Kleinschmit et al. .................. 280/717

FOREIGN PATENT DOCUMENTS

| 1172274 | 8/1984 | Canada .................................. 280/716 |
| 0 268 007 | 5/1988 | European Pat. Off. . |
| 265675 | 5/1988 | European Pat. Off. ............... 280/716 |
| 439978 | 8/1991 | European Pat. Off. ............... 280/717 |
| 885959 | 9/1955 | Germany . |
| 1178719 | 9/1964 | Germany . |

*Primary Examiner*—Peter C. English
*Attorney, Agent, or Firm*—Lerner, David, Littenberg, Krumholz & Mentlik, LLP

[57] ABSTRACT

A McPherson front wheel suspension arrangement for motor vehicles having a vehicle body and a spring strut arranged for each wheel. The spring strut is attached to a suspension arm which is pivotably attached to the vehicle body by an elastic bushing. The elastic bushing is essentially annular in shape and constructed around a geometric axis. The elastic bushing has an annular elastic bushing element positionally controlled in a seat in the suspension arm, and permits pivotal movement of the suspension arm. The elastic bushing element surrounds a holding element with a conical portion fixed to the lower part of the vehicle body. The conical portion of the holding element is conical in shape, narrowing in a downwards direction, and has a conical outer surface. The elastic bushing element includes a conical cavity adapted to the shape and dimensions of the conical surface of the conical portion of the holding element. The conical surfaces of the conical portion and the cavity serve as guiding surfaces during an assembly phase during mounting of the suspension arm on the vehicle body.

6 Claims, 4 Drawing Sheets

5,938,220

PIVOT BUSHING FOR MCPHERSON TYPE SUSPENSION

TECHNICAL FIELD

The present invention relates to a front wheel suspension arrangement for motor vehicles, and more particularly a McPherson type front wheel suspension.

BACKGROUND OF THE INVENTION

Front wheel suspensions of the McPherson type for motor vehicles are available in various embodiments and imply that the vehicle wheels, by means of such a suspension, are individually suspended by means of so-called spring struts, the upper parts of which are pivotably arranged in the vehicle body and the lower parts of which carry a wheel axle and are also rotatably and pivotably arranged in the vehicle body via a suspension arm. A common type of suspension arm presents three anchoring points, of which the two inner anchoring points form the pivotable mounting in the vehicle body of the suspension arm. The pivotal movement of the suspension arm in the vehicle body generally takes place about a geometrical suspension arm axis which extends essentially in the longitudinal direction of the vehicle. Accordingly, the two pivot means are usually designed as two bushings, the geometrical axes of which extend generally in the longitudinal direction of the vehicle. Since demands regarding assembly time are continually increasing, it has been noted that previously known solutions have implied difficulties regarding simultaneous fitting of different components of two pivoting means, and has more or less also required a millimeter accuracy of the relative positions of the components, so as to allow an assembly to be carried out.

SUMMARY OF THE INVENTION

The object of the present invention is to eliminate the above-mentioned drawbacks and consequently provide shorter assembly times, at the same time that reasonable requirements can be made regarding the precision of the relative positions of the components during the assembly stage.

Said object is accomplished by means of a device according to the present invention, which provides a McPherson strut suspension arrangement for a front wheel of a motor vehicle having a vehicle body and a spring strut supporting the front wheel on the motor vehicle. The spring strut has a lower portion and a suspension arm having a plurality of anchoring points including an inner, rear anchoring point. The rear anchoring point includes a seat for pivotably connecting the suspension arm to the vehicle body to allow rotation about a suspension arm axis extending essentially in a longitudinal direction of the vehicle. The rear anchoring point includes a rear pivot device constructed around a geometric axis transverse to a roll plane of the vehicle and the suspension arm axis. The rear pivot device comprises a central holding element arranged co-axially with the geometric axis and includes at least one conical portion fixed on the vehicle body and facing downwardly and narrowing in a downwards direction and an elastic bushing element mounted in the seat and including a cavity adapted to the shape and dimensions of the holding element. The bushing element allows pivotal movement of the suspension arm, and the cavity serves as a guide for the elastic bushing element during assembly of the suspension arm on the vehicle body.

The holding element of the suspension arrangement may include an upper conical portion and a lower conical portion, each having the shape of truncated cones having a wider end and a narrow end. The upper conical portion includes a first co-axial bore and is adapted to be inserted from above the bushing element. The lower conical portion includes a second co-axial bore and is adapted to be inserted from below the bushing element. Upon assembly, the narrow ends of the upper and lower conical portions are disposed adjacent one another in the cavity of the bushing element. The cavity is adapted to the shape and dimensions of the upper and lower conical portions.

The suspension arrangement may include a cross member connected to the vehicle body so that the lower conical portion is fixed on the cross member. The cross member may include a hole and a holding screw associated with the rear pivot device. The holding screw may be adapted to be inserted from below the arrangement during assembly. The cross member is attached to the upper conical portion by inserting the holding screw through the hole in the cross member and through the second co-axial bore of the lower conical portion, into and extending through the first co-axial bore of the upper conical portion so that the cross member, is attached to the upper conical portion.

The invention also includes a pivot device for pivotably connecting a suspension arm to a motor vehicle body in accordance with the above.

BRIEF DESCRIPTION OF THE DRAWINGS

The invention will be described in the following with an embodiment and with reference to the annexed drawings, in which:

FIG. 2 shows a view from above of a suspension arm forming part of the front wheel suspension and provided with the device according to the invention, whereas FIG. 3 shows a partially broken vertical cross-section through a pivot means according to the invention, in an assembled state, whereas

PREFERRED EMBODIMENT

Figure 1:
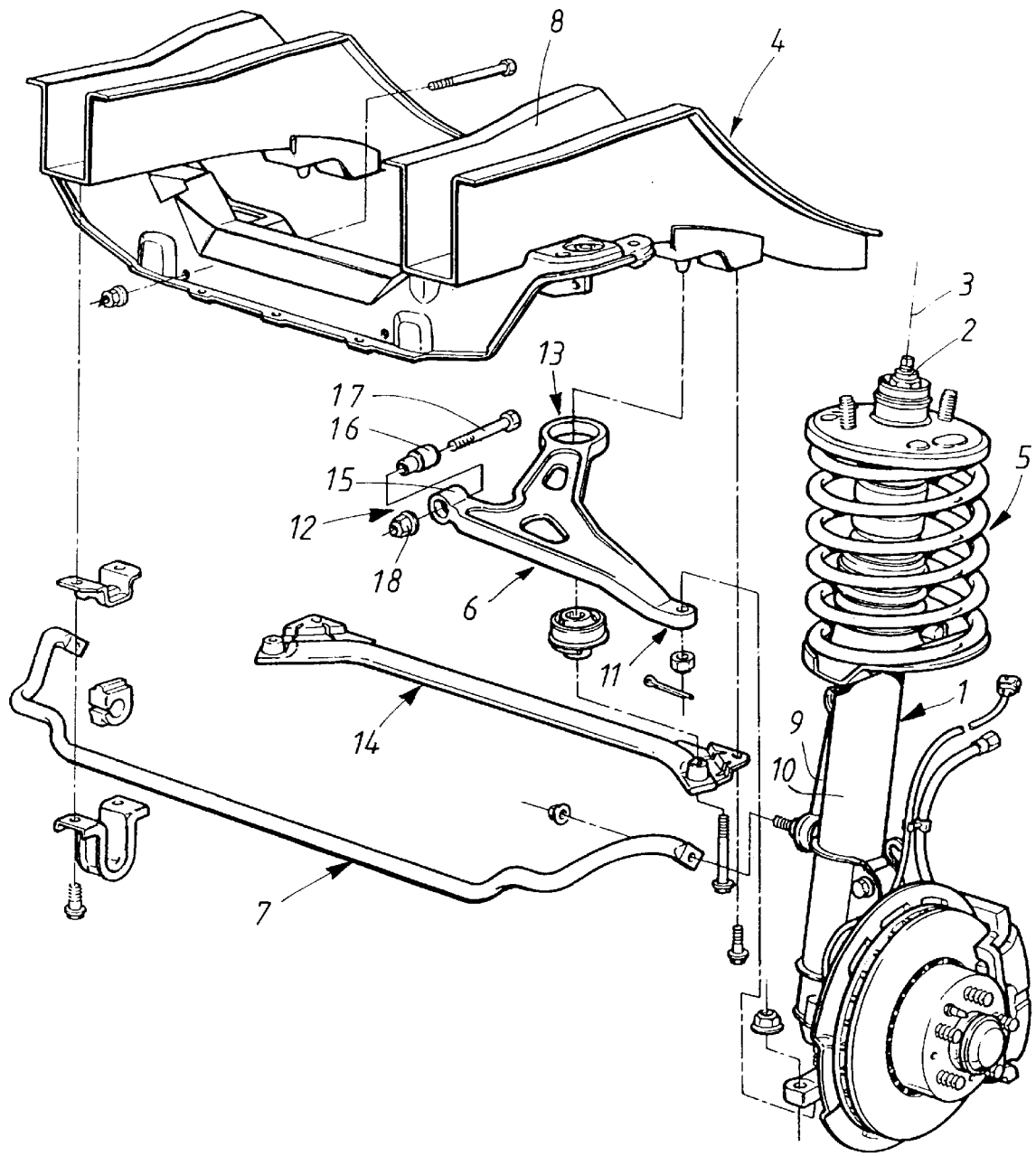
FIG. 1 shows an exploded view of a front wheel suspension provided with the device according to the invention.

The front wheel suspension shown in FIG. 1 is of the McPherson type, the main parts of which are well known. For this reason, the general design will only be mentioned briefly. The front wheel suspension consists essentially of a spring strut 1 arranged on each side of the vehicle. The upper end 2 of the spring strut is pivotably arranged about its longitudinal axis 3 over the vehicle's body 4, usually in the upper part of its wheel housing. In a manner which is known, the spring strut comprises a spring device 5 and a shock absorber which provide a resilient and suppressed longitudinal expansion and compression movement, respectively, of the spring strut, the lower part of which is pivotably connected to the vehicle body via a suspension arm 6. In addition, the spring strut 1 carries at the lower part thereof a wheel axle which is adapted to carry a corresponding wheel for rotation about the axis of the wheel axle shaft. The front wheel suspension also comprises a stabilizer 7 which is mounted on the side beams 8 of the vehicle body. Each end of the stabilizer 7 is pivotably mounted on a respective tube 10 of the spring strut via a stabilizer link 9.

The suspension arm 6 is of the three-point type and presents an outer anchoring point 11 for said mounting of a lower bearing of the spring strut 1 and two inner anchoring points in the form of pivot means 12, 13 for the pivotable mounting of the suspension arm to the vehicle body, more particularly on the underside of the respective side beam 8. FIG. 1 also shows a cross member 14 which, together with the axle beam, serves to stiffen the front sections of the vehicle body in the transverse direction and for reinforcing the mounting of the suspension arm in the vehicle body. The cross member extends between the two side beams 8, at the underside thereof. The cross member 14 also forms a lower anchoring for one of the pivot means, i.e. the rear pivot means 13, which will be described in detail below.

Figure 2:
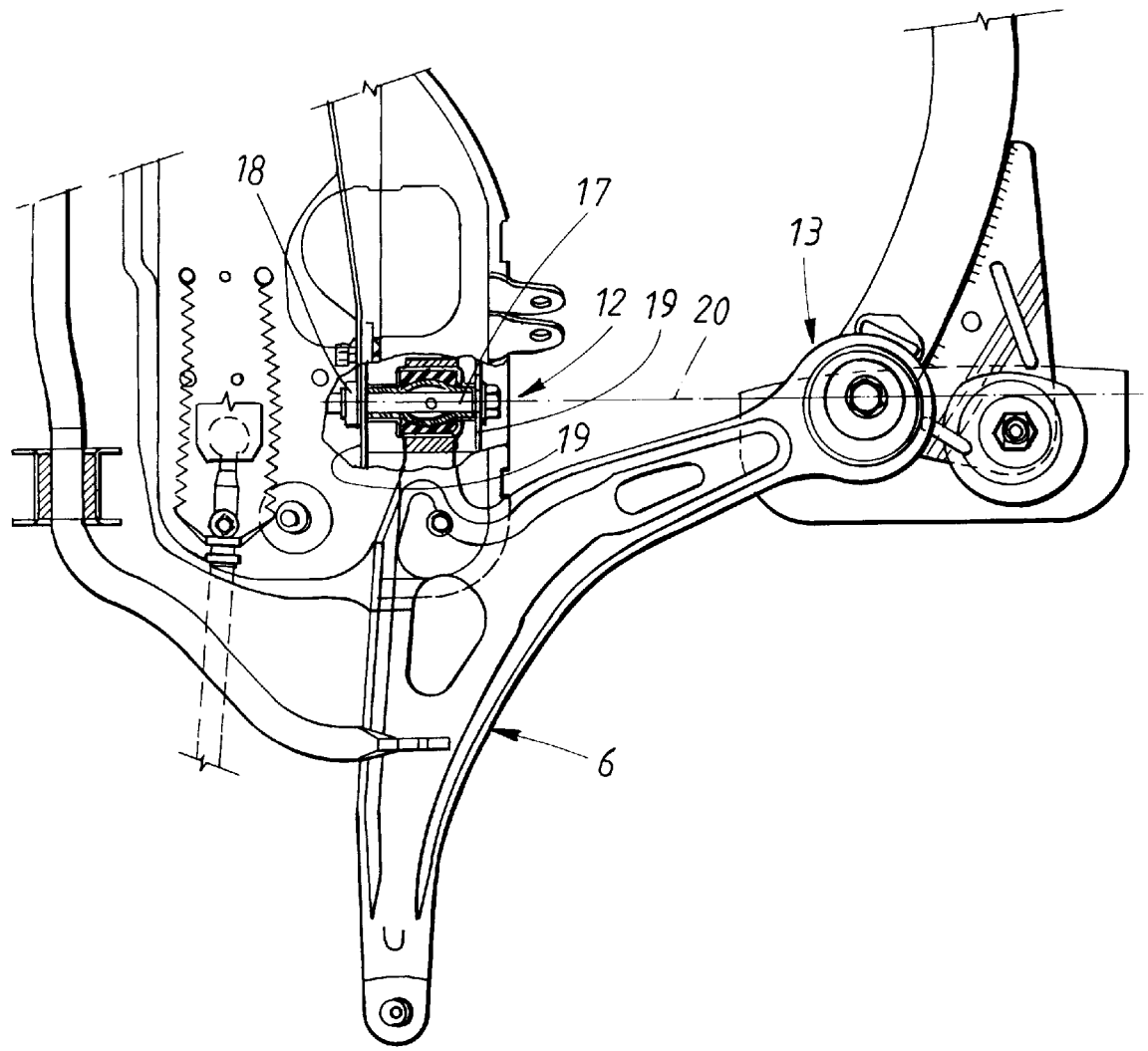

As is apparent from FIGS. 1 and 2, the front pivot means 12 of the suspension arm 6 is formed by a bushing extending essentially in the longitudinal direction of the vehicle and comprises a sleeve 15 formed in the suspension arm, an elastic bushing element 16 which is inserted in the sleeve and which is also shaped as a sleeve, and a through screw 17 with a nut 18 which extends between two flanges 19 on the underside of the vehicle body. The screw 17 and the elastic bushing element 16 and their guiding in the sleeve 15 form an essentially conventional pivot means with the screw 17 serving as a pivot axis, which together with the anchoring of the rear pivot means 13 defines the geometrical pivot axis 20 of the suspension arm 6, which axis extends essentially in the longitudinal direction of the vehicle, see FIG. 2. By means of the elasticity of the bushing, smaller shock-absorbing movements around a geometrical axis which extends transversely in relation to the roll plane of the vehicle and through the bushing are allowed.

Figure 3:
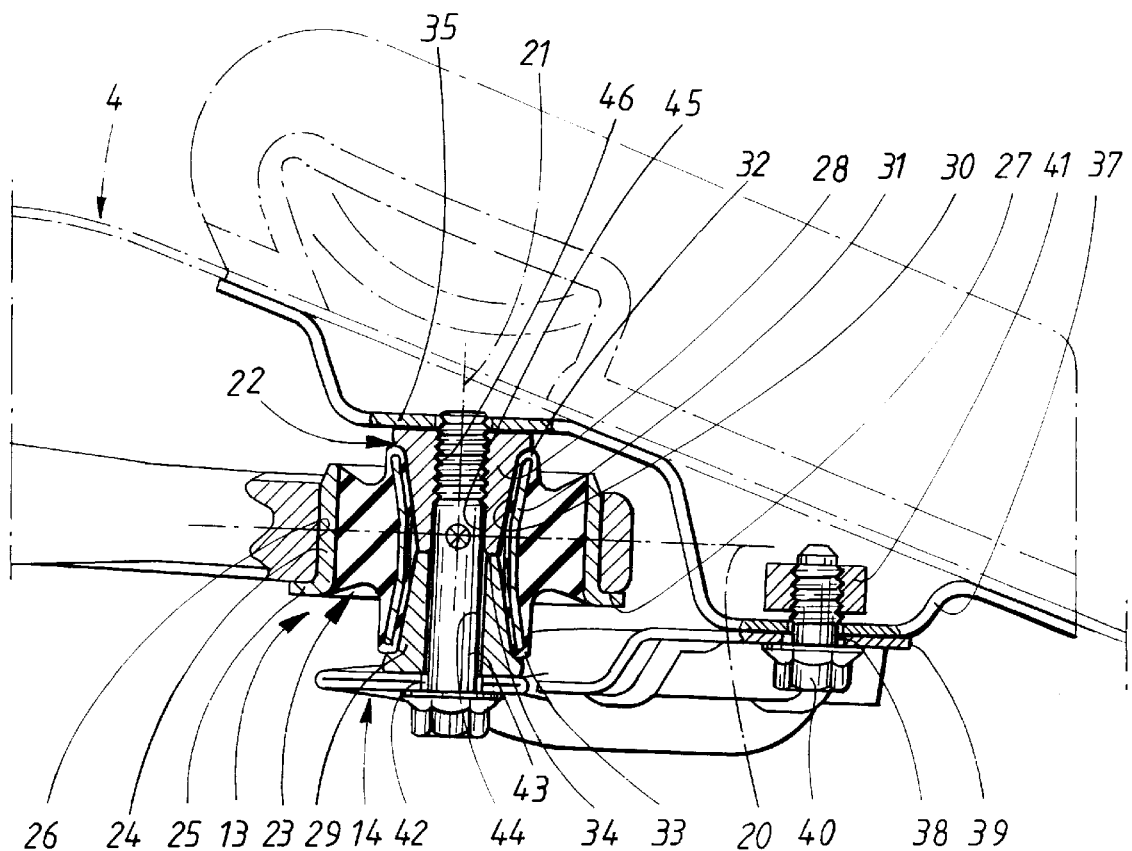

As is best apparent from FIG. 3 and in contrast to the front pivot device 12, the rear pivot means 13 is constructed around a geometric axis 21 which is arranged transverse to the roll plane of the vehicle and thus also to the suspension arm axis 20. In particular, the rear pivot means 13 is essentially constructed of a holding element 22 which is arranged centrally in relation to the axis 21. The holding element 22 is preferably made from a hard material which is not prone to deformation, for example metal, and a surrounding elastic, essentially annular bushing element 23. The bushing element is in turn surrounded by an essentially cylindrical casing 24 of metal having an annular flange 25. The casing 24 is fitted in a seat in the form of a through cylindrical cavity 26 in the suspension arm. The flange maintains the casing 24 in position axially by means of contact against an edge portion 27 of the suspension arm around the cavity 26. The casing is also held in the cavity 26 by means of press fitting, for example.

In the shown example, the holding element 22 presents two conical portions 28, 29 which face each other and which are identical in the shown example. The elastic bushing element 23 presents a through cavity 30 having a shape and dimensions which are suitable for the two conical portions 28, 29, i.e. it has the form of two truncated cones having base surfaces which face away from each other. In the shown example, the conical inner wall of the cavity is reinforced by means of a metal sleeve 31 with an essentially corresponding shape. By means of its dual conical form, the cavity 30 presents an upper widened opening with an essentially circular opening edge portion 32 and a widened opening which in a corresponding way opens out downwardly and which is limited by a opening edge portion 33 which is widened downwardly. The cavity narrows conically towards the centre of the cavity, in particular adjacent the end surfaces 34 and 48 of the two truncated conical portions 28, 29, respectively.

Thus, the upper conical portion 28 of the holding element 22 is turned downwardly and is fixed with its wider end on a portion 35 of the vehicle body, more precisely in the area where the axle beam and the respective side beam 8 are connected. Thus, the conical portion 28 extends downwardly from above in the cavity 30 of the elastic bushing element 23 in an assembled state. The upper conical portion 28 is mounted on the body, for example by means of welding. The second conical portion 29 faces upwards and is, in the assembled state of the device, inserted in the cavity 30 of the elastic bushing element 23 from below. Furthermore, it is fixed, for example by means of welding, on the upper side of the cross member 14 which is screwed on a portion 37 of the body at both ends of the cross member, by means of a screw 40 which is inserted from below through a hole 38 in the end 39 of the cross member. The screw 40 is screwed in a nut section 41 of the body, alternatively a separate conventional nut. The two conical portions 28, 29 present at their respective bases a flange-like protrusion 28', 29', against which the respective opening edge portions 32, 33 are supported.

A screw 43 is inserted from below through a hole 42 in the cross member 14, for connection of the two conical portions 28, 29 of the holding element 22 and thus for the pivotable mounting of the suspension arm 6 at its rear, inner pivot point. The screw 43 extends coaxially through the cavity 30 of the elastic bushing 23, more precisely through the co-axial bores 44, 45 of the lower and upper conical portions, respectively. In the shown example, the screw is screwed in a threaded portion 46 of the bore of the upper conical portion. Alternatively, or additionally, the screw may also be screwed in a threaded portion of the vehicle body.

By means of the elastic bushing element 23 of the pivot means 13, the movements of the suspension arm 6 are allowed, i.e. both pivotal movements about the suspension arm axis 20 and minor pivotal movements transverse to the roll plane of the vehicle about an imaginary pivot axis through the front pivot means are allowed, in order to absorb a torque on the suspension arm around said essentially vertical axis due to substantial irregularities in the roadway, heavy retardations and the like. For this purpose, and as is apparent from FIG. 2, the pivot means according to the invention is preferably not concentrically designed. Instead, the cavity 30 of the elastic bushing element 23 is positioned excentrically, slightly in the direction towards the longitudinal symmetrical axis of the vehicle, since the highest torque about the front guiding axis, transverse in relation to the suspension arm axis 20, occurs in a counterclockwise fashion. In this manner, an optimal damping is achieved.

However, the greater pivotal movement of the suspension arm 6 takes place about the suspension arm axis 20, which is illustrated in FIG. 3. Thus, this pivotal movement is allowed by means of the rear pivot means 13 despite its general design and symmetry about the axis 21 which is transversely arranged in relation to the roll plane. The transverse axis 21 also coincides with the direction of assembly of the front wheel suspension, which in a pre-assembled state is mounted in the body together with the engine, in a direction straight from below, during which the body of the vehicle is in an elevated position.

Figure 4:
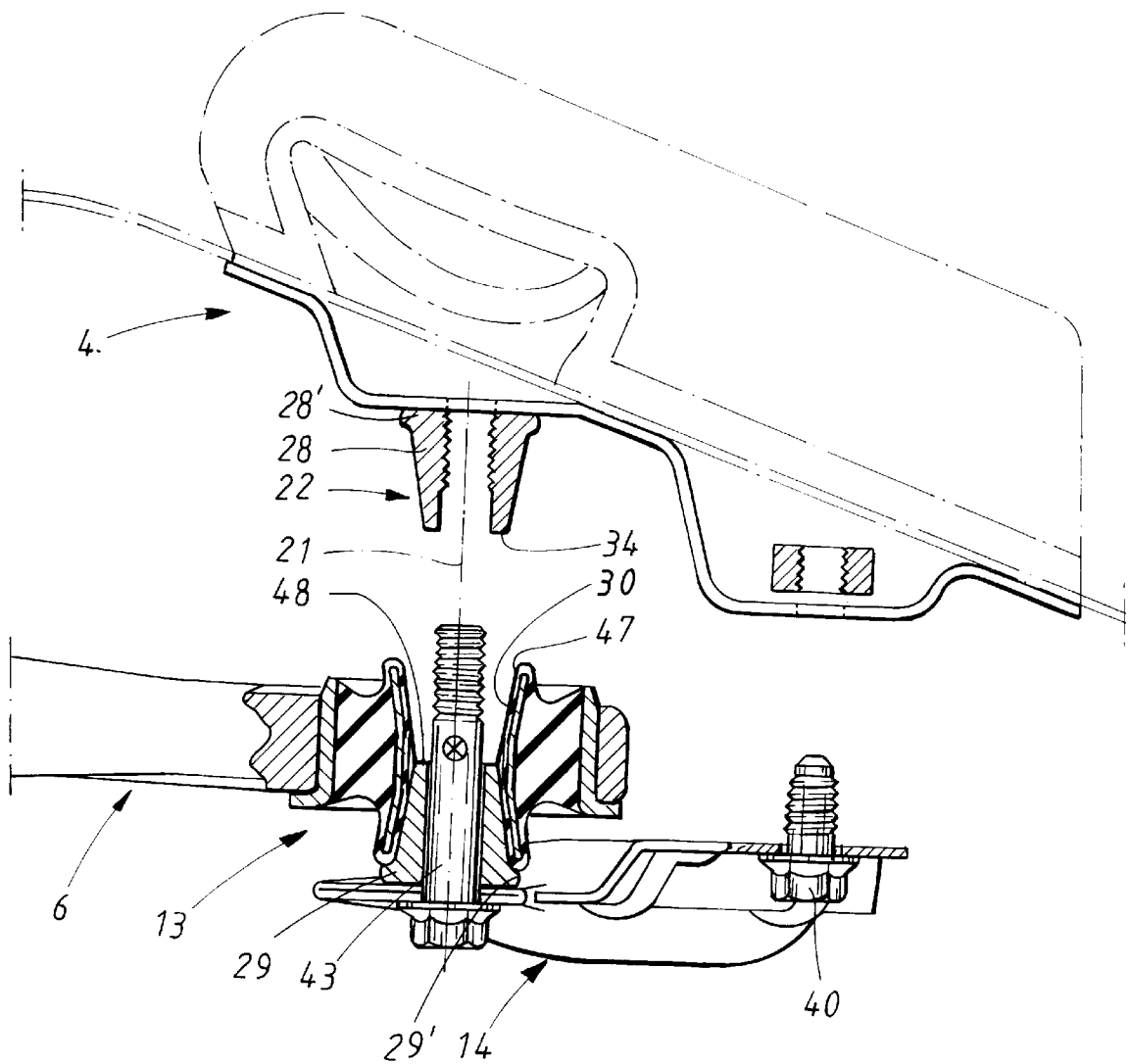
FIG. 4 shows a corresponding cross-section through the pivot means according to the invention, in an assembly stage.

As is shown in FIG. 4, the body is manufactured with the upper conical portion 28 of the holding element fixed to the body and projecting downwardly from the body, whereas the other portion of the pivoting means 13 is mounted in the suspension arm 6. The suspension arm 6 is pre-assembled with the cross member, with the lower conical portion 29 being inserted from below in the cavity 30. Due to the fact that the end surface 48 of the conical portion is narrower at the lower opening of the cavity, a relatively low precision is required during the insertion, which in the case of a deviation corrects the lateral position to a correct position. Thereafter, an assembly of the entire suspension kit is carried out synchronously for both right and left sides by lifting the cross member 14 assembled together with the two suspension arms 6 in an upwards direction towards the upper conical portion 28, which due to the fact that its end 34 is narrower than the opening 47 of the cavity 30 is inserted in the cavity even if a substantial longitudinal deviation transverse to the assembly direction or geometric axis, 21 should be present. An automatic centering of the conical portion is obtained by means of an alignment along the conical wall of the cavity. If the suspension arm 6 and the cross member 14 are positioned by means of special assembly tools, the screw 43 as well as the screw 40 may be mounted and screwed on in a later step in which the screws can be correctly centered and find their threaded portions on the body side without difficulty. As is shown in FIG. 4, the screws may be included and may be mounted synchronously in direct connection with the assembly of the other bushing parts. However, they should be allowed to be resilient downwardly in the initial phase of the guiding.

The invention is not limited to the embodiments which are described above and shown in the drawings, but may be varied within the scope of the appended claims. For example, the cross member 14 may in principle be replaced with a smaller bracket which is attached to the body, or it may be left out. The two conical portions can be replaced by one single conical portion which narrows in an upwards direction, the through cavity 30 in the bushing element 23 presenting a diameter which narrows in an upwards direction.

In this context, the terms "conical portion" and "conical form" also include shapes having polygonal base surfaces which narrow in the direction towards a truncated top portion.

I claim:

1. A McPherson strut suspension arrangement for a front wheel of a motor vehicle having a vehicle body, a spring strut supporting the front wheel on the motor vehicle, the spring strut having a lower portion, and a suspension arm having a plurality of anchoring points, including an inner, rear anchoring point including a seat for pivotably connecting said suspension arm to said vehicle body to allow rotation about a suspension arm axis extending essentially in a longitudinal direction of said vehicle, said inner, rear anchoring point including a rear pivot device constructed around a geometric axis transverse to a roll plane of said vehicle and said suspension arm axis, said rear pivot device comprising a central holding element arranged co-axially with said geometric axis and including at least one conical portion fixed on said vehicle body and facing downwardly and narrowing in a downwards direction and an elastic bushing element mounted in said seat and including a cavity adapted to the shape and dimensions of said holding element, whereby said bushing element allows pivotal movement of said suspension arm, and said cavity serves as a guide for said elastic bushing element during assembly of said suspension arm on said vehicle body.

2. The suspension arrangement of claim 1, wherein said holding element includes an upper conical portion and a lower conical portion, each having the shape of truncated cones having a wider end and a narrow end, said upper conical portion including a first co-axial bore and being adapted to be inserted from above said bushing element and said lower conical portion including a second co-axial bore and being adapted to be inserted from below said bushing element, whereby said narrow ends of said upper and lower conical portions are disposed adjacent one another in said cavity of said bushing element and said cavity is adapted to the shape and dimensions of said upper and lower conical portions.

3. The suspension arrangement of claim 2, further comprising a cross member connected to said vehicle body, said lower conical portion being fixed on said cross member.

4. The suspension arrangement of claim 3, wherein said cross member includes a hole, and further comprising a holding screw associated with said rear pivot device, said holding screw being adapted to be inserted from below during an assembly phase through said hole in said cross member and through said second co-axial bore of said lower conical portion, into and extending through said first co-axial bore of said upper conical portion, whereby said cross member is attached to said upper conical portion.

5. A pivot device for pivotably connecting a suspension arm to a motor vehicle body of a motor vehicle having a McPherson suspension arrangement, said suspension arm including a seat and a suspension arm axis extending essentially in a longitudinal direction of said vehicle, said pivot device comprising a holding element adapted to be co-axially mounted with a geometric axis transverse to a roll plane of said motor vehicle and said suspension arm axis, said holding element including at least one conical portion adapted to be fixed on said vehicle body and facing downwardly and narrowing in a downwards direction, and an elastic bushing element mountable in said seat and including a cavity adapted to the shape and dimensions of said holding element whereby when mounted in said seat said bushing element allows pivotal movement of said suspension arm and said cavity serves as a guide for said elastic bushing element upon assembly of said suspension arm on said vehicle body, said holding element including an upper conical portion and a lower conical portion, each having the shape of truncated cones having a wider end and a narrow end, said upper conical portion including a first co-axial bore and being adapted to be inserted from above said bushing element and said lower conical portion including a second co-axial bore and being adapted to be inserted from below said bushing element, whereby said narrow ends of said upper and lower conical portions are disposed adjacent one another in said cavity of said bushing element and said cavity is adapted to the shape and dimensions of said upper and lower conical portions.

6. A pivot device for pivotably connecting a suspension arm to a motor vehicle body of a motor vehicle having a McPherson suspension arrangement, said suspension arm including a seat and a suspension arm axis extending essentially in a longitudinal direction of said vehicle, said pivot device comprising a holding element adapted to be co-axially mounted with a geometric axis transverse to a roll plane of said motor vehicle and said suspension arm axis, said holding element including at least one conical portion adapted to be fixed on said vehicle body and facing downwardly and narrowing in a downwards direction, and an elastic bushing element mountable in said seat and including a cavity adapted to the shape and dimensions of said holding element whereby when mounted in said seat said bushing element allows pivotal movement of said suspension arm and said cavity serves as a guide for said elastic bushing element upon assembly of said suspension arm on said vehicle body, said holding element including an upper conical portion and a lower conical portion, each having the shame of truncated cones having a wider end and a narrow end, said upper conical portion including a first co-axial bore and being adapted to be inserted from above said bushing element and said lower conical portion including a second co-axial bore and being adapted to be inserted from below said bushing element, whereby said narrow ends of said upper and lower conical portions are disposed adjacent one another in said cavity of said bushing element and said cavity is adapted to the shape and dimensions of said upper and lower conical portions, and further comprising a holding screw, said holding screw being adapted to be inserted from below during an assembly phase through a hole in a cross member connected to said vehicle body, and through said second co-axial bore of said lower conical portion, into and extending through said first co-axial bore of said upper conical portion, whereby the cross member is attached to said upper conical portion.

* * * * *

UNITED STATES PATENT AND TRADEMARK OFFICE
CERTIFICATE OF CORRECTION

PATENT NO. : 5,938,220
DATED : August 17, 1999
INVENTOR(S) : Törneld It is certified that error appears in the above-identified patent and that said Letters Patent is hereby corrected as shown below:

Column 2, line 52, "over the vehicle's body" should read --on the vehicle's body--.

Column 4, line 6, after "welding." begin new paragraph.

Column 5, line 10, "assembly direction" should read --assembly direction,--.

Signed and Sealed this

Twenty-eighth Day of March, 2000

Attest:

Q. TODD DICKINSON

Attesting Officer

Commissioner of Patents and Trademarks